(12) United States Patent
Testa et al.

(10) Patent No.: US 12,519,714 B2
(45) Date of Patent: Jan. 6, 2026

(54) RESOURCE ALLOCATION USING TRAFFIC AGGREGABILITY AND FUTURE BANDWIDTH AVAILABILITY IN A NETWORK

(71) Applicant: TELEFONAKTIEBOLAGET LM ERICSSON (PUBL), Stockholm (SE)

(72) Inventors: Patrizia Testa, Solna (SE); Johan Fridh, Tullinge (SE); Alma Lukacevic, Gothenburg (SE); Peter Karlsson, Mölndal (SE); Ali Muhammad Chaudhry, Gothenburg (SE); Rikard Thid, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 18/692,689

(22) PCT Filed: Oct. 5, 2021

(86) PCT No.: PCT/IB2021/059144
§ 371 (c)(1),
(2) Date: Mar. 15, 2024

(87) PCT Pub. No.: WO2023/057790
PCT Pub. Date: Apr. 13, 2023

(65) Prior Publication Data
US 2024/0292275 A1    Aug. 29, 2024

(51) Int. Cl.
*H04L 45/12*     (2022.01)
*H04W 28/10*    (2009.01)

(52) U.S. Cl.
CPC .......... *H04L 45/123* (2013.01); *H04W 28/10* (2013.01)

(58) Field of Classification Search
CPC .............................. H04L 45/123; H04W 28/10
See application file for complete search history.

(56) References Cited

U.S. PATENT DOCUMENTS 7,903,573 B2 *  3/2011  Singer ............... H04L 45/38
                                              709/224
11,178,563 B2 * 11/2021 Bahnasy .............. H04L 47/283
(Continued)

OTHER PUBLICATIONS

"Common Public Radio Interface:eCPRI Interface Specification", Interface Specification, eCPRI Specification V1.2 (Jun. 25, 2018), 62 Pages.
(Continued)

*Primary Examiner* — G. C. Neurauter, Jr.
(74) *Attorney, Agent, or Firm* — Ericsson Inc.

(57) ABSTRACT

Embodiments of the invention provides methods, apparatus, and media to allocate resources in a network. In one embodiment, the method comprises identifying a request to route a traffic flow based on a policy, and for the identified request, selecting a source and destination node from a plurality of alternatives, and a path between the source and destination nodes for the traffic flow. The source and destination nodes and the path are selected based on a gain function, where the selection comprises generating values of the gain function, each value being generated based on bandwidth availability for future bandwidth requests as well as aggregability of the traffic flow and other traffic flows determined using candidates from the plurality of node pair alternatives and the plurality of path alternatives. The method also includes routing the traffic flow between the selected source and destination nodes along the selected path in the network.

20 Claims, 10 Drawing Sheets

(56) References Cited

U.S. PATENT DOCUMENTS

| | | | |
|---|---|---|---|
| 11,368,220 B2* | 6/2022 | Qi | H04B 10/27 |
| 11,395,189 B2* | 7/2022 | Anand | H04L 12/413 |
| 11,425,601 B2* | 8/2022 | Noriega | H04W 28/0942 |
| 12,375,975 B2* | 7/2025 | Hu | H04W 24/02 |
| 2020/0044930 A1* | 2/2020 | Stafford | H04L 41/0896 |
| 2020/0100137 A1* | 3/2020 | Panchal | H04L 41/147 |

OTHER PUBLICATIONS

"Common Public Radio Interface (CPRI); Interface Specification", Interface Specification, CPRI Specification V7.0 (Oct. 9, 2015), 128 Pages.

Ericsson Radio System, "Transport Intelligent Functions", E-RAN provisioning Automation & Optimization (internal), May 2018, 19 Pages.

Hu, W., et al., "A comprehensive optical mobile fronthaul network toward high-fidelity, flexible and low-latency transport", Photonic Network Communications, (2019) 37: 322-334, Apr. 5, 2019, 14 Pages.

"IEEE Standard for Local and Metropolitan Area Networks—Bridges and Bridged Networks", IEEE Computer Society, IEEE Standards Association, IEEE Std 802.1Q™-2018 (Revision of IEEE Std 802.1Q-2014), 1993 Pages.

Wan, T., et al., "ZeroJitter: an SDN based Scheduling for CPRI over Ethernet", 2016 IEEE Global Communications Conference (GLOBECOM), Dec. 4-8, 2016, 8 Pages.

Wang, L., et al., "A Scheduling Algorithm for Low Jitter in Ethernet-Based Fronthaul", 2019 IEEE Symposium on Computers and Communications (ISCC), Jun. 29, 2019-Jul. 3, 2019, 6 Pages.

\* cited by examiner

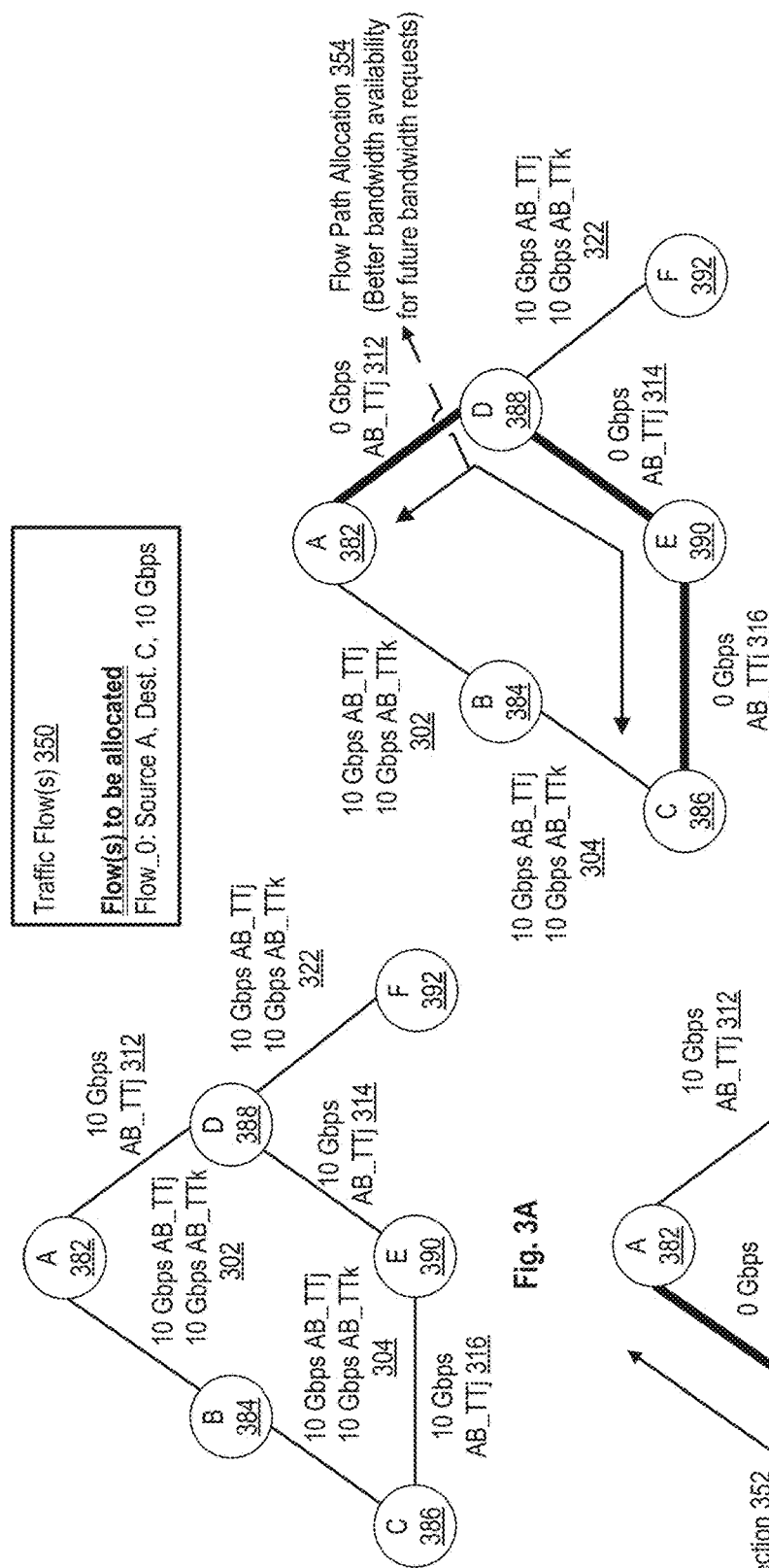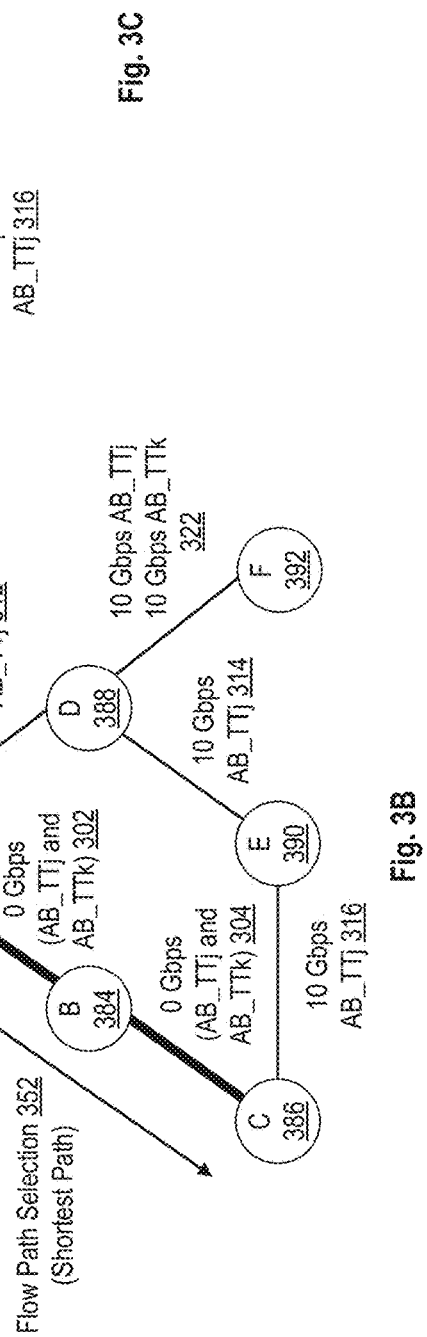
Fig. 3A
Fig. 3B
Fig. 3C

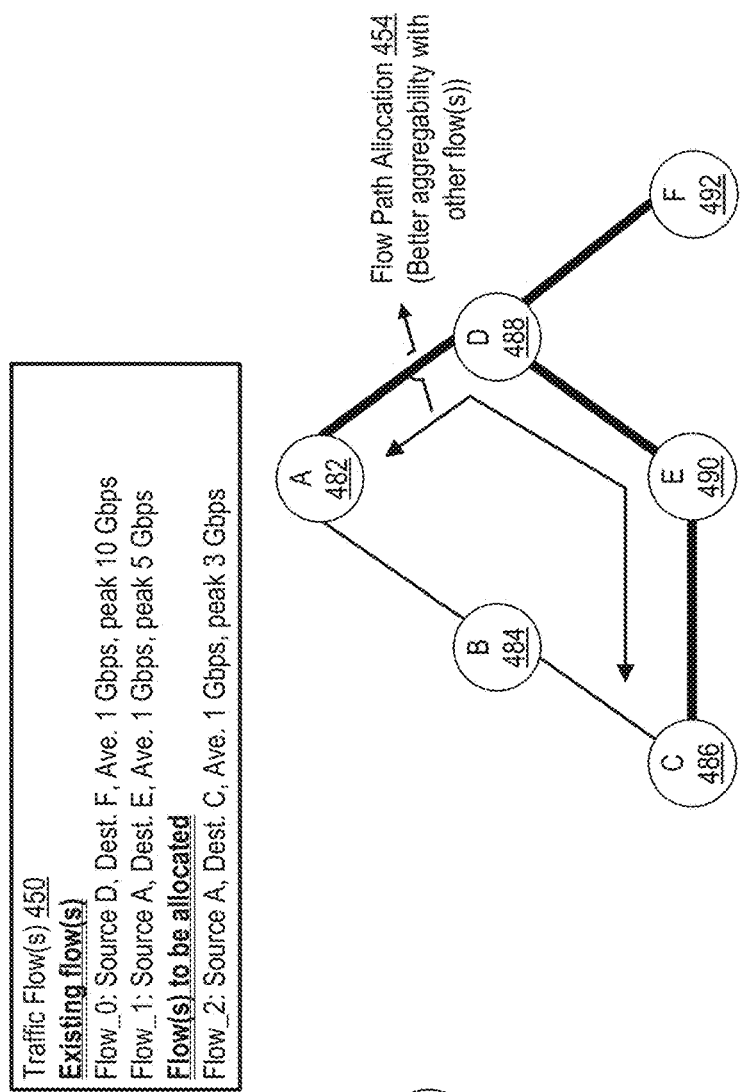
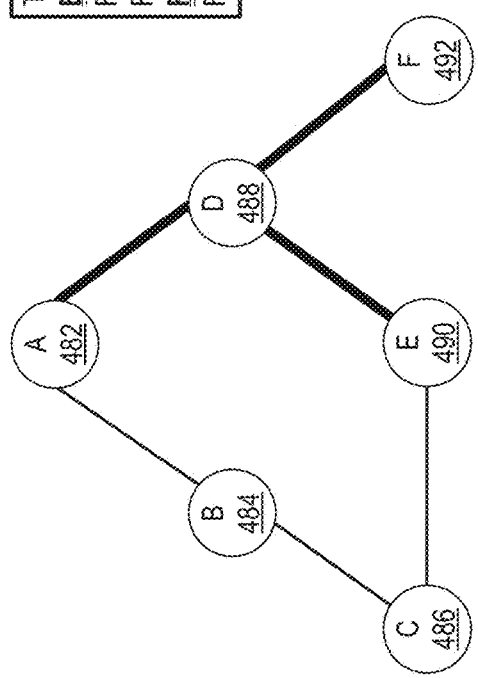
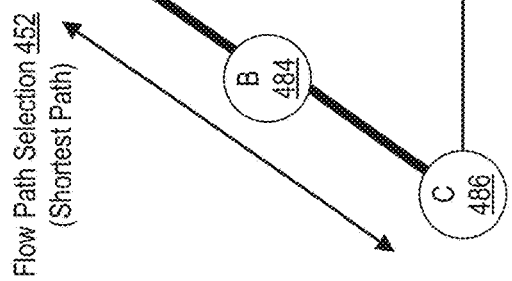
Fig. 4A
Fig. 4B
Fig. 4C

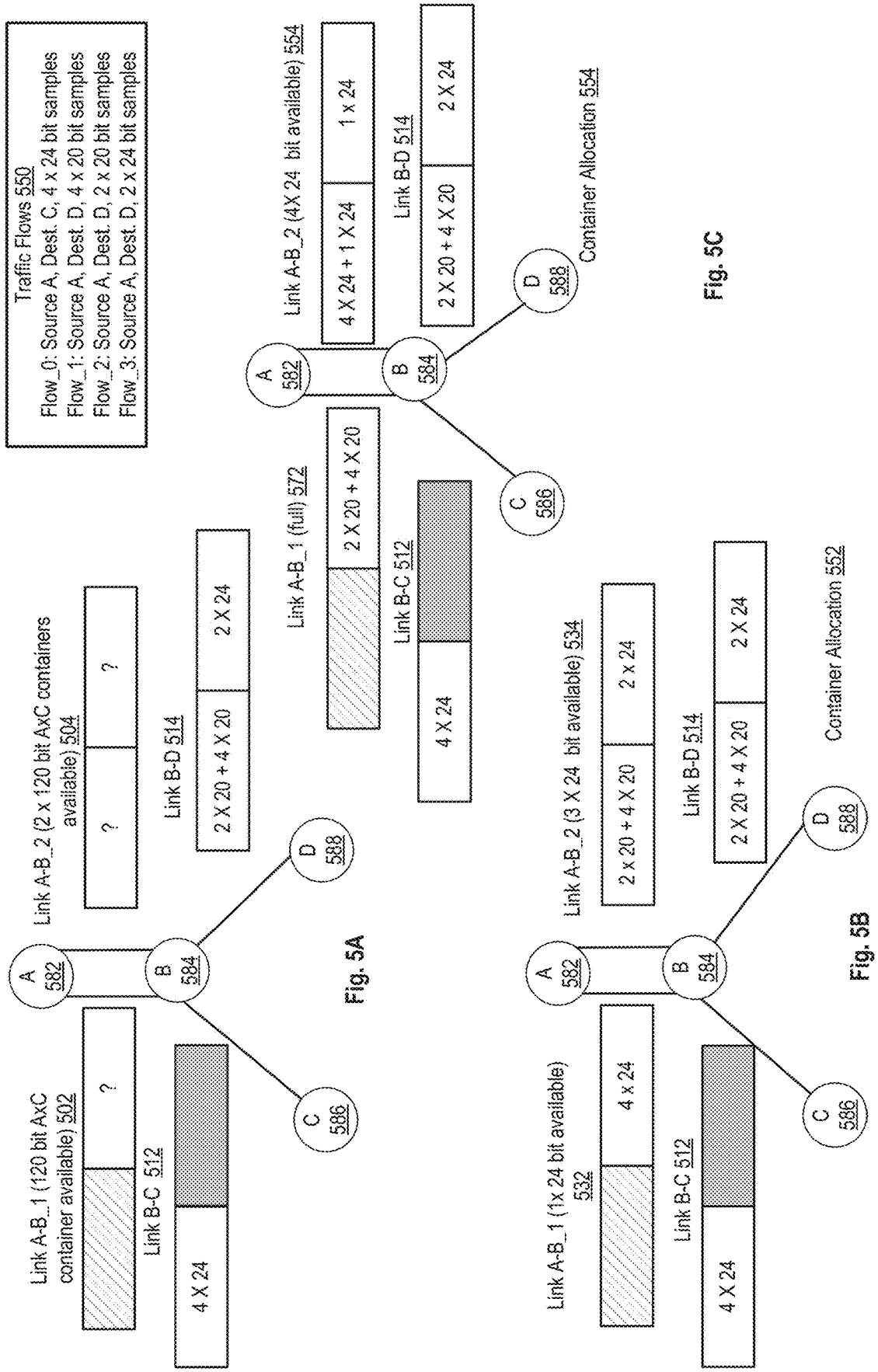

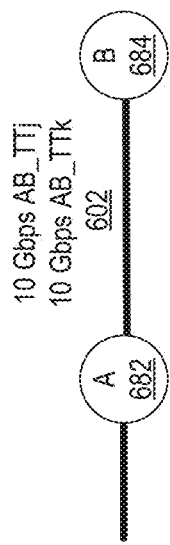
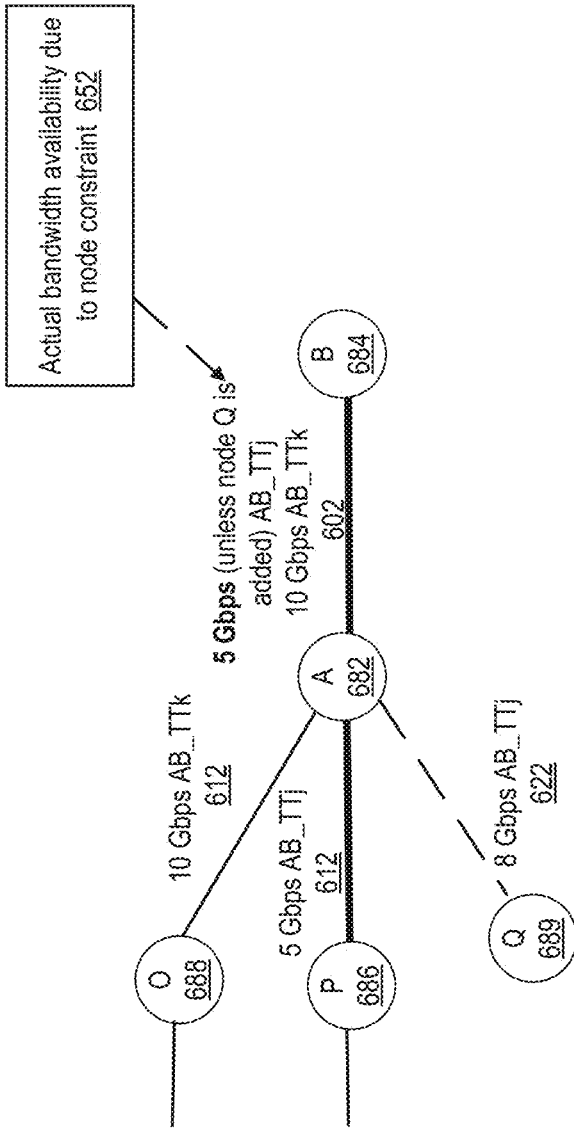

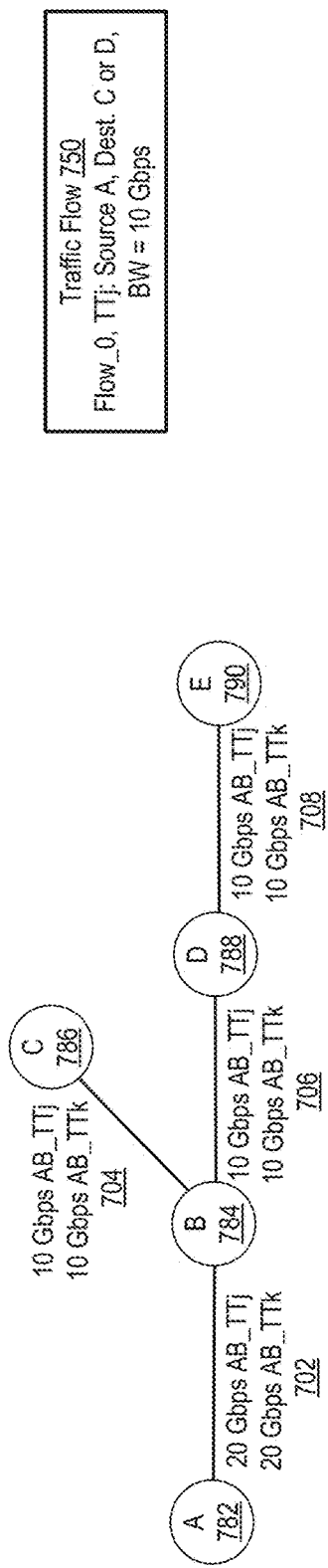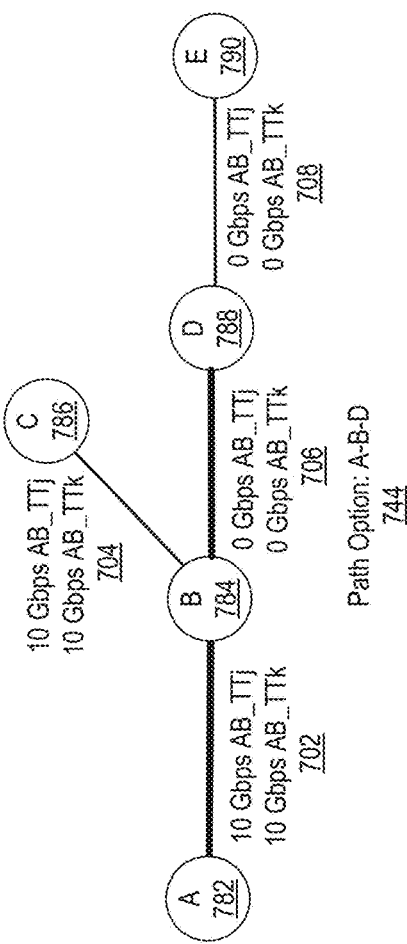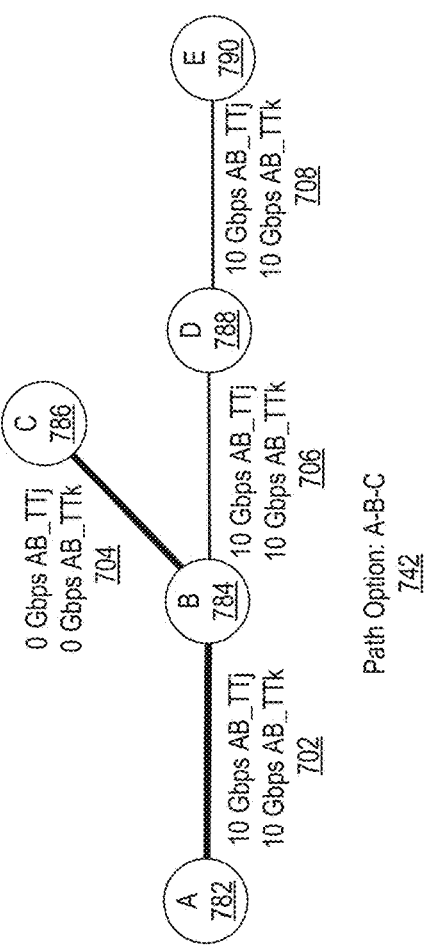
Fig. 7A
Fig. 7B
Fig. 7C

| Flow ID | Flow Priority (weight) | Source Option | Destination Option | Traffic Type (TT) | TT Priority | Bandwidth | Aggregability Indication |
|---|---|---|---|---|---|---|---|
| Flow_0 | Medium (2) | A, B | C, D | Circuit 4x24 bit | 1 | 4x24 bit samples | None |
| Flow_1 | High (3) | A, B | C, D | Circuit 2x20 bit | 1 | 2x20 bit samples | 2x20, 1x20, 3x20 flow |
| Flow_2 | Medium (2) | A, B | C, D | Circuit 4x20 bit | 2 | 4x20 bit samples | same TT |
| Flow_3 | Medium (2) | A, B | C, D | Packet 1G_av 10G_P | 1 | Ave. 1 Gbps & short peaks of 10 Gbps | same or similar TT, diff. peak |
| Flow_4 | Low (1) | A, B | C, D | Packet 2G_av 10G_P | 1 | Ave. 2 Gbps & short peaks of 10 Gbps | same or similar TT, diff. peak |
| Flow_5 | High (3) | A, B | C, D | Packet 3G_av 10G_P | 1 | Ave. 3 Gbps & short peaks of 10 Gbps | same or similar TT, diff. peak |

Table: Traffic flow to be allocated 852

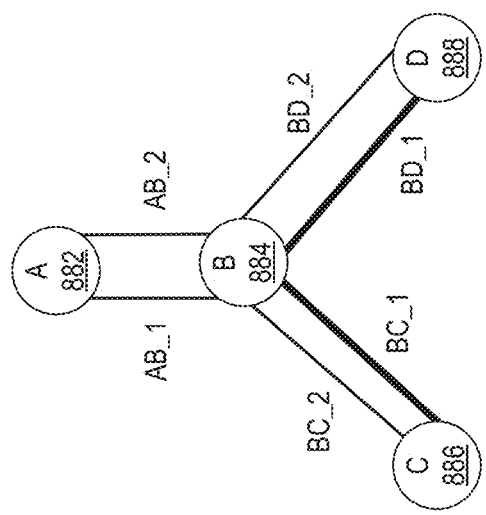

Fig. 8

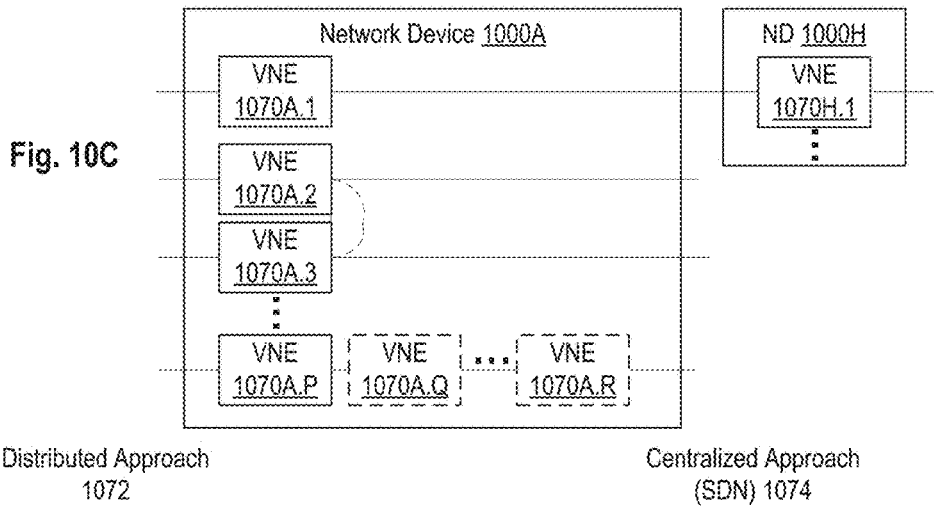
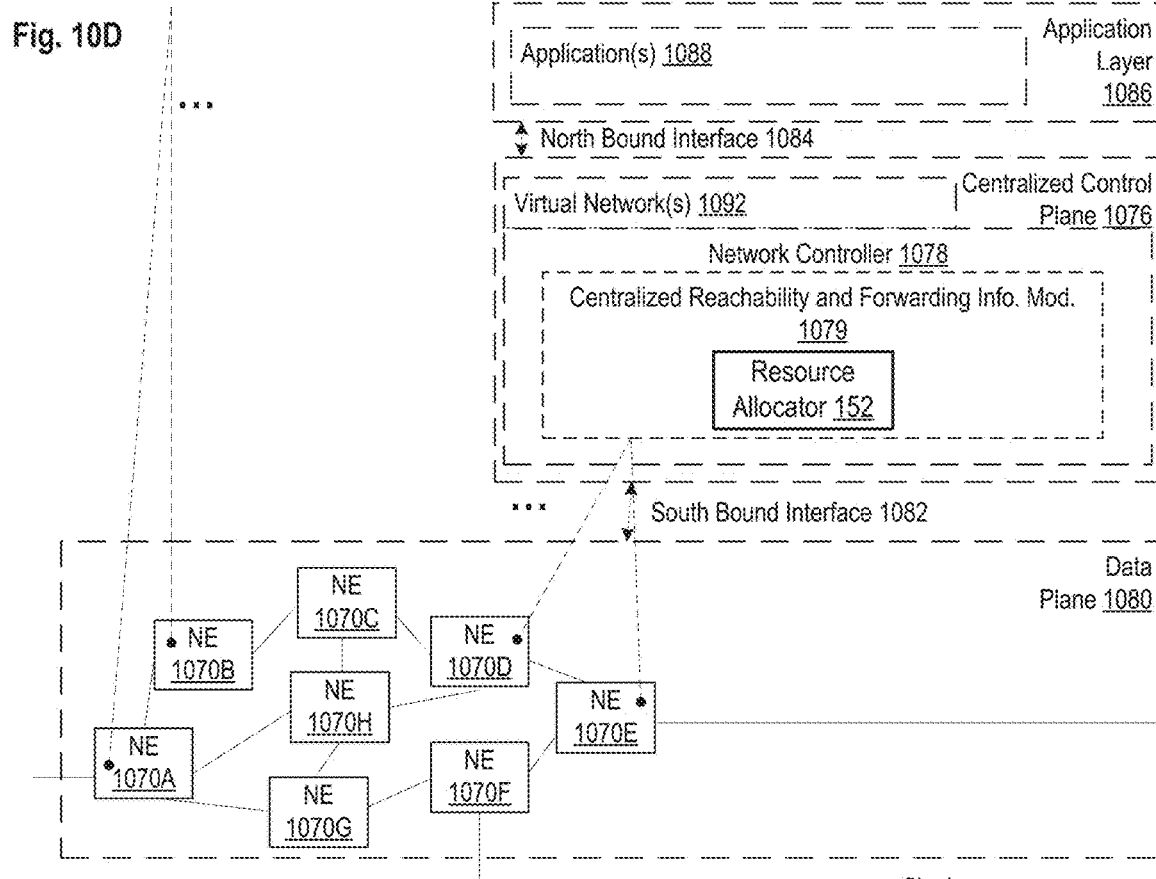
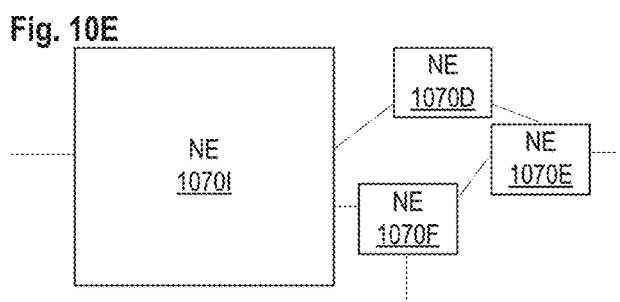
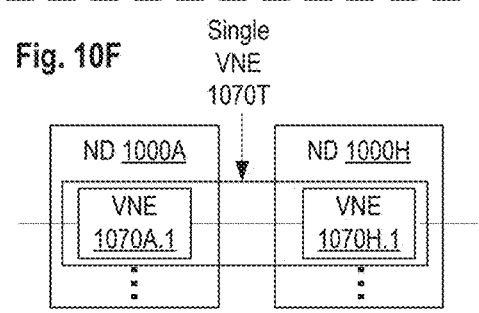

RESOURCE ALLOCATION USING TRAFFIC AGGREGABILITY AND FUTURE BANDWIDTH AVAILABILITY IN A NETWORK

This application is a 371 of International Application No. PCT/IB2021/059144 filed on Oct. 5, 2021, the disclosure of which is fully incorporated herein by reference.

TECHNICAL FIELD

Embodiments of the invention relate to the field of networking; more specifically, to allocating resources using traffic aggregability and future bandwidth availability in a telecommunications network.

BACKGROUND ART

The increasing varieties of traffic types and transport protocols that nowadays networks need to support have started to require network nodes to handle different traffic types. For example, a node in a network may configure its ports in different modes (e.g., to allow packet or circuit-switched traffic forwarding) depending on the capabilities of the node to be connected (a far end/remote node). These networks include the ones connecting Radio Equipment (RE) nodes with Radio Equipment Control (REC) nodes or REC internal networks connecting different baseband processing modules, providing both common public radio Interface (CPRI), which provides circuit switching transport, and enhanced CPRI interface (eCPRI), which provides packet switching transport.

Even for ports/links in the same mode, different traffic types are possible. Examples are the different possible CPRI frame structures with different number of slots (as known as samples) and slot sizes for different flow/connection rates and supported standards such as the $4^{th}$ Generation (4G) and $5^{th}$ Generation (5G) broadband cellular network technology.

Additionally, in some networks, processing resources can be placed in different network nodes and require mechanisms to select optimum locations among different options for the sources and destinations of traffic flows.

Traditional routing protocols and path computation mechanisms are not optimal to handle these new scenarios, and new mechanisms are needed to evaluate different network nodes as source and destination of traffic flows, and to select the optimal paths for the traffic flows.

SUMMARY

Embodiments of the invention provide methods, apparatus, and media to allocate resources using traffic aggregability and future bandwidth availability in a telecommunications network. In one embodiment, a method is disclosed for allocating traffic flows to nodes of a telecommunications network. The method comprises identifying a request from a plurality of requests to route corresponding traffic flows in the telecommunications network in an order based on a policy, and for the identified request, selecting a source node and a destination node from a plurality of node pair alternatives, and a path between the source and destination nodes for a traffic flow corresponding to the identified request from a plurality of path alternatives. The path includes one or more links, and the source and destination nodes and the path are selected based on a gain function, where the selection comprises generating values of the gain function, each value being generated based on bandwidth availability for future bandwidth requests as well as aggregability of the traffic flow and other traffic flows determined using candidates from the plurality of node pair alternatives and the plurality of path alternatives. The method also includes routing the traffic flow between the selected source and destination nodes along the selected path in the telecommunications network.

In one embodiment, a network device is disclosed for allocating traffic flows to nodes of a telecommunications network. The network device includes a processor and machine-readable storage medium coupled to the processor, wherein the machine-readable storage medium stores instructions, which when executed by the processor, are capable to perform identifying a request from a plurality of requests to route corresponding traffic flows in the telecommunications network in an order based on a policy, and for the identified request, selecting a source node and a destination node from a plurality of node pair alternatives, and a path between the source and destination nodes for a traffic flow corresponding to the identified request from a plurality of path alternatives. The path includes one or more links, and the source and destination nodes and the path are selected based on a gain function, where the selection comprises generating values of the gain function, each value being generated based on bandwidth availability for future bandwidth requests as well as aggregability of the traffic flow and other traffic flows determined using candidates from the plurality of node pair alternatives and the plurality of path alternatives. The instructions are capable to further perform routing the traffic flow between the selected source and destination nodes along the selected path in the telecommunications network.

In one embodiment, a machine-readable storage medium is disclosed for allocating traffic flows to nodes of a telecommunications network. The machine-readable storage medium is coupled to a processor and stores instructions, which when executed by the processor, are capable to perform identifying a request from a plurality of requests to route corresponding traffic flows in the telecommunications network in an order based on a policy, and for the identified request, selecting a source node and a destination node from a plurality of node pair alternatives, and a path between the source and destination nodes for a traffic flow corresponding to the identified request from a plurality of path alternatives. The path includes one or more links, and the source and destination nodes and the path are selected based on a gain function, where the selection comprises generating values of the gain function, each value being generated based on bandwidth availability for future bandwidth requests as well as aggregability of the traffic flow and other traffic flows determined using candidates from the plurality of node pair alternatives and the plurality of path alternatives. The instructions are capable to further perform routing the traffic flow between the selected source and destination nodes along the selected path in the telecommunications network.

Embodiments of the invention provide new ways to measure how efficiently network resources are used by traffic flows along their paths between source and destination nodes, and to maximize aggregation gain allowed by traffic flows with same characteristics as well as efficiency of resource sharing among flows with different characteristics.

BRIEF DESCRIPTION OF THE DRAWINGS

The invention may best be understood by referring to the following description and accompanying drawings that are used to illustrate embodiments of the invention. In the drawings:

FIG. 3A shows a packet switching network with a traffic flow to be allocated.

FIG. 3B shows bandwidth availability upon a path selection following the traditional path cost analysis.

FIG. 3C shows bandwidth availability upon a path selection considering future bandwidth availability per some embodiments.

FIG. 4A shows another network with a packet switching traffic flow to be allocated.

FIG. 4B shows a path selection following the traditional path cost analysis.

FIG. 4C shows a path selection considering traffic aggregability per some embodiments.

FIG. 5A shows a network with circuit switching traffic flows to be allocated.

FIGS. 5B and 5C show two ways to multiplex multiple traffic flows per some embodiments FIGS. 6A and 6B show resource allocation considering node bandwidth availability per some embodiments.

FIGS. 7A to 7C show resource allocation to reduce bottleneck per some other embodiments.

FIG. 8 shows an example of allocation traffic flows in a network using a gain function per some embodiments.

FIG. 10C illustrates various exemplary ways in which virtual network elements (VNEs) may be coupled according to some embodiments.

FIG. 10D illustrates a network with a single network element on each of the NDs of FIG. 10A, and within this straightforward approach contrasts a traditional distributed approach (commonly used by traditional routers) with a centralized approach for maintaining reachability and forwarding information (also called network control), according to some embodiments.

FIG. 10E illustrates the simple case of where each of the NDs implements a single NE, but a centralized control plane has abstracted multiple of the network elements (NEs) in different NDs into (to represent) a single NE in one of the virtual network(s), according to some embodiments.

FIG. 10F illustrates a case where multiple VNEs are implemented on different NDs and are coupled to each other, and where a centralized control plane has abstracted these multiple VNEs such that they appear as a single VNE within one of the virtual networks, according to some embodiments.

DETAILED DESCRIPTION

The following description describes methods and apparatus for resource allocation using traffic aggregability and future bandwidth availability in a telecommunications network. The disclosed embodiments may be applicable generally to telecommunications networks (e.g., mobile and wireline telecommunications networks). Particularly, the embodiments are applicable to a telecommunications network (also referred to as simply network) where (1) the locations of the source and destination nodes of a traffic flow have multiple options, and/or (2) one or more nodes within the network may support multiple traffic delivery modes (e.g., packet switching, circuit switching, or a combination of both), and a node within the network may support multiple traffic types.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Resource Allocation in Telecommunications Networks

Figure 1:
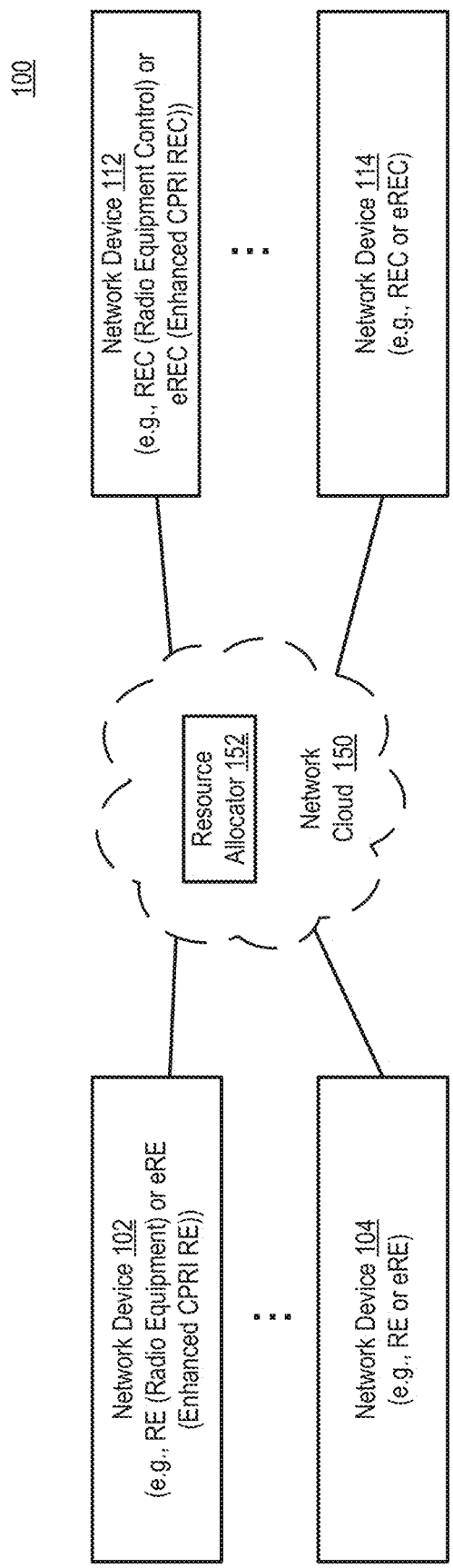
FIG. 1 illustrates a telecommunications network in which embodiments may be implemented.
Figure 10A:
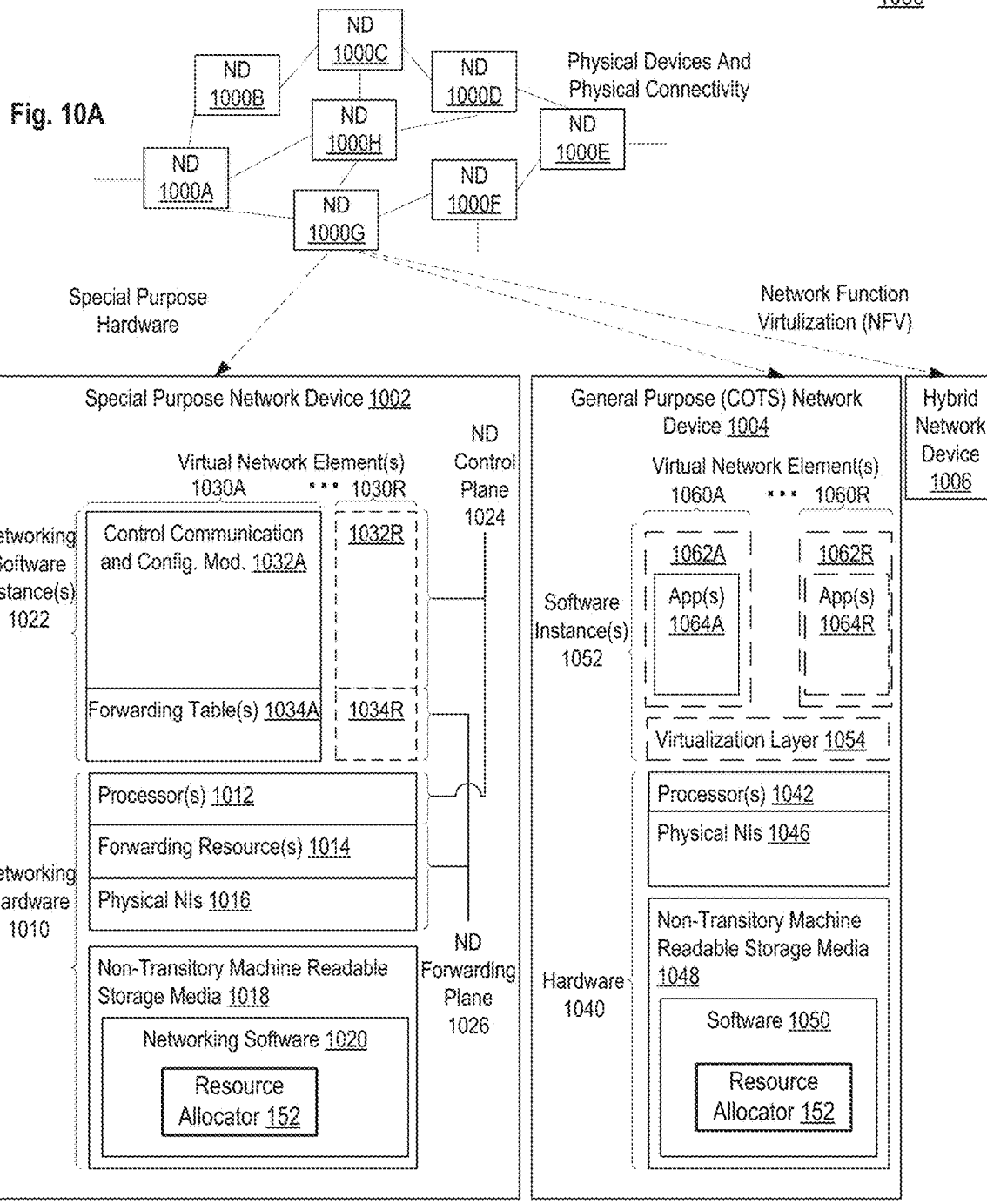
FIG. 10A illustrates connectivity between network devices (NDs) within an exemplary network, as well as three exemplary implementations of the NDs, according to some embodiments.

FIG. 1 illustrates a telecommunications network in which embodiments may be implemented. The telecommunications network 100 may include a mobile network (also referred to as a wireless network or a cellular network), a wireline telecommunications network, or a mix of both. The network 100 includes network devices 102, 104, 112, and 114. These network devices communicate through a network cloud 150. The network cloud 150 includes network devices such as network bridges, switches, and routers, and it may be operated by a network service provider. The network cloud 150 and network devices 102, 104, 112, and 114 may be implemented as network 1000 as shown in FIG. 10A. The network 100 may include a fronthaul portion (also referred to as fronthaul network) between baseband units and radio units (also referred to as radio heads or masts) at the edge of a mobile network, and/or a backhaul portion (also referred to as backhaul network) between the baseband units and a core/backbone network.

In the fronthaul network, a baseband unit (BBU) transports using a baseband frequency and can be divided into a distributed unit (DU) for real time functions and a centralized unit (CU) for non-real time functions such as radio resource control (RRC). The BBU can also be virtualized to increase capacity and reduce latency. The traffic to be forwarded between BBUs and radio units may be allocated to one of several BBUs as the source node (or destination node), and one of several radio units as the destination node (or source node). Thus, resource allocation in the fronthaul portion of a network is more flexible in that the source and destination node of a traffic flow may be selected from multiple source and destination pair alternatives to make traffic forwarding more efficient.

Each network device implements one or more network interfaces. For example, a network device may implement a common public radio interface (CPRI) to support circuit switching or an enhanced CPRI (eCPRI) to support packet switching per standards. A network device such as network devices 102 and 104 may be a radio equipment (RE) node or an enhanced CPRI RE (eRE) node; and a network device such as network devices 112 and 114 may be a radio equipment control (REC) node or an enhanced CPRI radio equipment control (eREC) node. As known in the art, an RE node and a REC node communicate through a CPRI interface, while an eRE node and an eREC node communicate through an eCPRI interface.

The resource allocator 152 in network 100 allocates resources for traffic flows to be forwarded, where the allocation includes selecting the source and destination nodes of a traffic flow and the path between the source and destination node (e.g., through one or more transit nodes) for the traffic flow. While the resource allocator 152 is shown as within the network cloud 150, it may be implemented in a network device configured as an RE/eRE node or an REC/eREC node (see e.g., FIGS. 10A and 10D). Note that the resources to be allocated include available bandwidth on links and nodes, where the bandwidth may be used by packet switching, circuit switching, or another mode to forward traffic flows.

Figure 2:
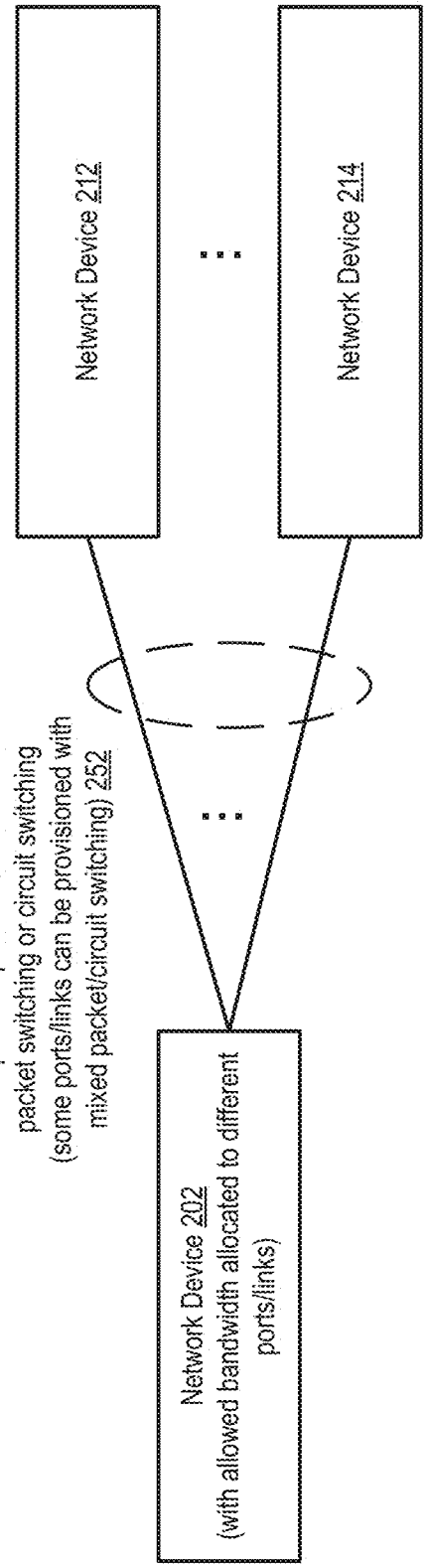
FIG. 2 illustrates provisions of ports/links per some embodiments.

A network device may configure its ports and/or links to forward traffic in different modes. FIG. 2 illustrates provisions of ports/links per some embodiments. Network devices 202, 212, and 214 may be one of the network devices in FIG. 1. A network device may provision its ports/links to deliver traffic in different modes as shown at reference 252.

For example, network device 202 may provision a port to implement CPRI so that the port connects to a link/links to network device 212, and circuit switching is used to forward traffic between network devices 202 and 212. In circuit switching, time division multiplexing (TDM) may be used to share resources among multiple traffic flows through links between the two network devices. Network device 202 may provision a port to implement eCPRI so that the port connects to a link/links to network device 214, and packet switching is used to forward traffic through links between network devices 202 and 214. In packet switching, statistical multiplexing may be used to share resources among multiple traffic flows. Some network devices may provision a port to implement another interface so that the mixed circuit and packet switching may be supported through the corresponding link. A network device may change the provision of a port/link from one mode to another to forward traffic flows (e.g., from packet switching to circuit switching or vice versa).

With the flexible source/destination selection and switching mode configuration, traditional path cost analysis for traffic flow forwarding becomes obsolete. Traditional metrics measure the path cost of a traffic flow using the number of hops of the path and required capacity/bandwidth across the path for each individual traffic flow. Yet the number of hops may change due to the selection of different source and destination and the required capacity/bandwidth may vary due to aggregation of different traffic flows. Thus, embodiments use one or more metrics below for resource allocation in a network for traffic forwarding.

Bandwidth Availability for Future Bandwidth Requests

This metric measures how much the bandwidth available for other traffic flows and/or traffic types to be served would be reduced by a selection of particular source/destination and path for a given traffic flow. Not explicitly considering the bandwidth to be used by a traffic flow along a path (but instead considering the available bandwidth for other traffic once the traffic flow is allocated) helps to understand the actual cost of that allocation and the actual network bandwidth that would remain for the other flows (or other bandwidth requests) if that path is allocated.

For example, traffic flow A may have different path options between its source and destination while traffic flow B has only one path option. If the shortest path for traffic flow A uses all the bandwidth needed by traffic flow B on all or some links of the traffic flow B path option so that traffic flow A and traffic flow B cannot be supported together (e.g., when they have different traffic modes/types), the selection of the shortest path for traffic flow A results in no available bandwidth for traffic flow B.

To select the best path option of a traffic flow among different alternatives that allow the traffic flow to meet its quality of service (QoS) and/or service level agreement (SLA) requirements of the traffic flow, this metric considers the total available bandwidth resulting from each source/destination and path selection evaluated as the sum of the bandwidth that is available on network links for each of the other traffic flows and/or traffic types to be served. A resource allocator selects the option that maximizes the total available bandwidth as measured by this metric. Thus, the new metric implicitly considers the constraints on how different flow types can share network resources.

In some embodiments, the metric is defined as a function of available bandwidth on each link of all traffic flows/types to be served in a network.

Aggregability of a Traffic Flow and Other Traffic Flows

This metric measures how much a selected path option results in traffic flows being aggregated (aggregation and multiplexing are used interchangeably herein unless noted otherwise), so that a resource allocator may select an option that results in the best bandwidth aggregation as measured. The metric may identify different aggregations of traffic flows, where an aggregation of traffic flow is a set of traffic flows for which statistical multiplexing can be exploited along a common path or sub-path in packet switching, or whose samples can be multiplexed together in a frame (e.g., a frame container used in the fronthaul portion of a network) along a common path/sub-path in circuit switching. The metric may also evaluate the available bandwidth of each aggregation of traffic flows resulting from the path option selected for a given traffic flow, where the aggregation of traffic flows includes the given traffic flow and traffic flows already allocated in the network and future traffic flows that are to be allocated.

Bandwidth Availability of Nodes on a Path

A path to forward a traffic flow may traverse one or more transit nodes, which is a node that a traffic flow passes through and that is not the source or destination node of the traffic flow. A node may be a source/destination node for one traffic flow and a transit node for another. Each node has an available bandwidth to be allocated. A source/destination and path selection will reduce available bandwidth on the source/destination and transit nodes. This metric measures the possible bandwidth bottleneck on the source/destination and transit nodes of a path, where a bottleneck can result from saturated links of a transit node preventing another traffic flow from using available bandwidth in some parts of the network. A resource allocator selects the option that minimizes the bandwidth bottleneck on the nodes as measured by this metric.

Priority of Traffic Flow/Type/Aggregation

Another metric to consider when allocating resources to a traffic flow is the priorities of the traffic flow, corresponding traffic type, and/or corresponding traffic aggregation. The priority may be specified based on the QoS requirements or traffic characteristics of the traffic flows and indicated through a weight. A function may calculate a weighted sum of available bandwidth for traffic flows/types/aggregations, where a higher weight is assigned to the available bandwidth of the traffic flow/type/aggregation with a higher priority. Based on the function, the source and destination nodes and path are to be selected to result in more available bandwidth for traffic flow/type/aggregation of flows with higher priorities than the other ones with lower priorities. It follows that great benefit will result from assigning high weight to aggregations of flows.

Using one or more of these metrics, embodiments may determine for each traffic flow the source/destination and path option to minimize the effect of usage of bandwidth in the network by that traffic flow, thereby maximizing the bandwidth that could be available for other traffic flows/types, if alternative paths are possible. Additionally, the embodiments prefer paths where traffic with the same types can be aggregated (e.g., where statistical multiplexing can be exploited, or where time-division multiplexing can be implemented) and avoid waste of bandwidth. The more the resulting total available bandwidth, the higher the number of traffic flows/types/aggregations can be served, and bottlenecks can be avoided.

The fronthaul portion of a network is a good example for which to use an optimized common and multi-traffic-type aware path computation solution in embodiments. That is because both CPRI and eCPRI share the same network connecting the baseband units (BBUs) with the radio units, and it is desirable to have one single method applicable to the different traffic types presented in a network and to take into account all possible supported traffic types at the same time during the optimization determination. Additionally, each of the source and destination nodes can be selected from multiple BBUs and radio units, and the flexibility of source/destination node selection broadens the problem to be addressed as resource allocation, where both source/destination nodes and path are to be allocated, in contrast to traditional traffic routing, where the source/destination nodes are predetermined, and the optimization is to select the path between the source/destination nodes. The resource allocation in embodiments considered the bandwidth availability on links and/or nodes, traffic aggregability, and/or traffic priority.

Several examples are given below to consider link bandwidth availability, traffic aggregability and priority, and node bandwidth availability. Note while some embodiments use the connections between RE/eRE and REC/eREC (through CPRI and eCPRI respectively) in the fronthaul portion of a network as examples, the embodiments are not so limited and can be used in other parts of the network as well.

Resource Allocation Considering Link Bandwidth Availability

FIG. 3A shows a network with a packet switching traffic flow to be allocated. Nodes A to F are referred to at references 382 to 392. Each of the links is provisioned to support one or more traffic types, where the available bandwidth for a first traffic type TTj and a second traffic type TTk on a link is shown as AB_TTj and AB_TTk, respectively, referenced as 302, 304, 312, 314, 316, and 322. When the two traffic types share a link, the bandwidth of the link can be available for either traffic type, thus link A-B has a bandwidth of 10 Gbps that can be available for either TTj or TTk. The resource allocator is to allocate resources for traffic flows 350 that includes a traffic flow of the first traffic type, flow_0, between source node A and destination node C.

FIG. 3B shows bandwidth availability upon a path selection following the traditional path cost analysis. In this approach, the shortest path between A and destination node C is A-B-C. By allocating the path for flow_0 following nodes A-B-C as shown at reference 352 (a link shown using a bold line in a figure indicates that the link is on an allocated path), the available bandwidth on all the links in the network for the first traffic type TTj becomes 40 Gbps afterward, and the available bandwidth on all the links in the network for the second traffic type TTk becomes 10 Gbps afterward, when all the available bandwidth on all the links is summed up.

FIG. 3C shows bandwidth availability upon a path selection considering future bandwidth availability per some embodiments. In this approach, assume that an alternative longer path may also meet the delay requirement of flow_0, by allocating the path for flow_0 following nodes A-D-E-C as shown at reference 354, the total available bandwidth for TTj becomes 30 Gbps afterward, and TTk 30 Gbps afterward. Since the total available bandwidth for both TTj and TTk is 60 Gbps, higher than the 50 Gbps (40 Gbps for TTj and 10 Gbps for TTk) following the shortest path approach illustrated in FIG. 3B, the path A-D-E-C is selected based on the future link bandwidth availability after the allocation. Thus, the path allocation 354, by considering bandwidth availability for future bandwidth requests, offers more bandwidth efficiency than the traditional path cost analysis. Note that while the example uses bidirectional links, embodiments are applicable to unidirectional links since a bidirectional ink includes two unidirectional links and the analysis for unidirectional links is similar.

Resource Allocation Considering Traffic Aggregability and Priority

FIG. 4A shows another network with a packet switching traffic flow to be allocated. using links between nodes A to F, references 482 to 492 As shown at reference 450, flow_0 is forwarded through the link between source node D and destination node F, and flow_1 is forwarded from source node A to destination node E through A-D-E, and the flow to be allocated is flow_2, from source node A to destination node C. The traffic flows flow_0, flow_1, and flow_2 are different types, but they are similar, each with 1 Gbps average bandwidth, and peak bandwidth at 10, 5, and 3 Gbps respectively.

FIG. 4B shows a path selection 452 following the traditional path cost analysis. In this approach, the shortest path between A and destination node C is still A-B-C, similar to FIG. 3B. In this approach, however, flow_2 shares no links with flow_0 or flow_1, so no traffic aggregation is achieved in this approach. Without any aggregation, a gain function may calculate this allocation to have a value of zero for aggregation.

FIG. 4C shows a path selection 454 considering traffic aggregability per some embodiments. In this approach, the resource allocator aims at aggregating traffic flows. Since flows_0, flow_1, and flow_2 are packet switching traffic, and while they are different traffic types, they are similar and can form a multiplexing group (MG) to be aggregated. With this allocation, the gain function may calculate the gain of this allocation to have a value of two (assuming each traffic flow has the same weight of one) since flow_1 and flow_2 are aggregated. The gain function may also calculate the aggregated bandwidth from the aggregation, which will be 2 Gbps average bit rate at links A-D and A-E each, and 4 Gbps average bit rate in total. Thus, the gain function indicates that the allocation of FIG. 4C is better than the one in FIG. 4B.

Using statistical multiplexing to aggregate multiple traffic flows in packet switching can offer significant advantages.

For example, flow_1 and flow_2 are traffic flows that are on average 1 Gbps over the span of ten seconds; while the traffic flows peaks at 5 and 3 Gbps respectively, when the peaks do not overlap, they can be safely multiplexed. For link D-E at the bandwidth of 5 Gbps, it is possible to forward both flow_1 and flow_2 simultaneously (aggregating) without congesting the link. Indeed, more traffic flows with the peak bandwidth request at 5 Gbps can be aggregated on the link D-E, as long as their peaks are not overlapping with those of other flows on the link. The more aggregation can be achieved, the better bandwidth efficiency can be achieved in the network, and the better the embodiments compare to the traditional approach.

Embodiments of the invention use not only statistical multiplexing in packet switching, but also time division multiplexing in circuit switching. FIG. 5A shows a network with circuit switching traffic flows to be allocated using links between nodes A to D, references 582 to 588. The time division multiplexing traffic is transmitted in slots structured in basic frames. For CPRI traffic in a fronthaul network, the frames comprise a number of fixed-length A×C (antenna-carrier) containers to transmit and receive digital in-phase and quadrature (I/Q) data. Each A×C container contains samples of the same size within the A×C container, but one A×C container does not necessarily have the same size samples as other A×C containers. A CPRI traffic flow is characterized by a constant number of samples per basic frame of a certain size.

As shown at reference 550, the traffic flows to be allocated includes flow_0, which has source and destination nodes at nodes A and C respectively, and the traffic flow has four 24-bit (4×24) samples. The flow_1, flow_2, and flow_3 have 4×20, 2×20, and 2×24 bit samples respectively with the same source and destination nodes at nodes A and D respectively. The resource allocator is to allocate one 120-bit A×C container at link A-B_1 (the other occupied container is shaded with cross lines) as shown at reference 502, and two 120-bit A×C containers at link A-B_2 as shown at reference 504. The link B-C at reference 512 and link B-D at reference 514 are easy to allocate, since the former needs to accommodate flow_0 only (the other container being occupied with four 24-bit samples as shown, and the second container is empty and shaded), and the latter needs to accommodate three flows (flow_1 to flow_3), and these three flows are multiplexed in the two containers (one way to multiplex the three flows is shown). The question for the resource allocator to address is how to multiplex the four traffic flows within the three containers (shown as including question marks) through links A-B_1 and A-B_2.

FIGS. 5B-5C show two ways to multiplex multiple traffic flows per some embodiments. FIG. 5B shows a first way of multiplexing the four traffic flows, where flow_0 takes the only container on link A-B_1, while the rest of the flows take the containers on link A-B_2. While the allocation results in 4×24 bit samples available with the two links combined, the allocation may be less ideal as flows sharing same/similar characteristics are often identified as a multiplexing group and preferred to be multiplexed together. In this example, flow_0 and flow_3 have 24-bit samples, and they belong to one multiplexing group (e.g., multiplexing group 0), while flow_1 and flow_2, having 20-bit samples, belong to another multiplexing group (multiplexing group 1). Traffic flows in multiplexing group 0 cannot be multiplexed together because the single container on link A-B_1 cannot accommodate both flows, and a gain function may calculate the gain of this aggregation to have a value of 1 (assuming all aggregation having the same weight), resulting from the aggregation of flow_1 and flow_2 and no aggregation of flow_0 and flow_3.

FIG. 5C shows the second way of multiplexing, which allocates flow_0 and flow_3 on link A-B_2 and allocates flow_1 and flow_2 (sharing the same 20-bit sample size) on link A-B-1. Since all traffic flows are multiplexed on the two links, the allocation in FIG. 5C is better than the allocation in FIG. 5B, and the gain function may calculate the gain of this allocation to have a value of 2, resulting from the aggregation of flow_0 and flow_3, and the aggregation of flow_1 and flow_2. Thus, the gain function shows that the allocation of FIG. 5C is better than the one in FIG. 5B. Note that a gain function may also calculate the aggregated bandwidth from the aggregations. In this case, for FIG. 5B, the aggregated bandwidth is (4+2)×20 bit samples, while for FIG. 5C, the aggregated bandwidth is (4+2)×20+(4+2)×24 bit samples, and the gain function still shows that the allocation of FIG. 5C is better.

Note that traffic flows, traffic types, and traffic aggregation (multiplexing groups) may be prioritized by assigning weights to them. For example, flow_3 in FIGS. 5A-C may be assigned a higher weight than the rest of the flows so that an allocation aggregating flow_3 will be prioritized over an allocation aggregating other flows. Additionally, a traffic type (e.g., 4×24 bit samples) may be assigned a higher weight than another traffic type (e.g., 2×20 bit samples). Furthermore, a traffic aggregation (e.g., multiplexing group 0) may be assigned a higher weight than another traffic aggregation (e.g., multiplexing group 1). The prioritization of traffic flows, traffic types, and/or traffic aggregation allows embodiments to consider the characteristics of different traffic flows and their associated QoS requirements or service level agreements (SLAs), and it makes the resulting aggregation to use network resources more efficient.

Resource Allocation Considering Node Bandwidth Availability

FIGS. 6A and 6B show resource allocation considering node bandwidth availability per some embodiments. FIG. 6A shows that the link 602 between node A at reference 682 and node B at reference 684 has 10 Gbps bandwidth available for traffic types TTj and TTk. Thus, if considering available link bandwidth alone, 10 Gbps may be allocated on the link 602 for TTj or TTk. Yet FIG. 6B shows that node A at reference 682 also connects to nodes O and P at references 688 and 686 with available bandwidth for TTk and TTj being 10 Gbps and 5 Gbps, respectively. Since node A is a transit node for traffic type TTj from node P, the available bandwidth for traffic type TTj on link 602 is only 5 Gbps as indicated at reference 652. If, however, node Q at reference 689 also connects to node A at reference 682 and the link 622 has an available bandwidth of 8 Gbps for TTj, then the available bandwidth for traffic type TTj on link 602 is 10 Gbps, since two links (links 612 and 622) have more than 10 Gbps available bandwidth for TTj and the node bandwidth is no longer the bottleneck for the link 602 (see Formula (2) below).

FIGS. 7A to 7C show resource allocation to reduce bottleneck per some other embodiments. FIG. 7A shows that the network includes nodes A to E at references 782 to 790, and the available bandwidth on each link for two traffic types, TTj and TTk, is listed as shown at references 702 to 708. The traffic flow to be allocated is flow_0, which has source node A, but the destination can be either node C or D, and the bandwidth is 10 Gbps as shown at reference 750.

In FIG. 7B, the traffic flow is allocated to the path 742 following nodes A-B-C (as the bold links show), which results in the change of available bandwidth for both traffic types. Summing up the available bandwidth in the network, the resource allocator determines that the total available bandwidth for both TTj and TTk is 30 Gbps.

In contrast, the traffic flow is allocated to the path 744 following nodes A-B-D in FIG. 7C. This allocation results in total available bandwidth for TTj to be 20 Gbps and TTk to be 20 Gbps. Note that the allocation at FIG. 7C causes bottlenecks at nodes B and D, resulting in less available bandwidth (available bandwidth for the combination of TTj and TTk being 40 Gbps in FIG. 7C vs. 60 Gbps in FIG. 7B). Thus, the resource allocator will select a path that minimizes node bottlenecks and select the destination C and the path option nodes A-B-C as shown in FIG. 7B.

Some Embodiments of Resource Allocation

FIGS. 3A to 7C show examples of resource allocation that consider link bandwidth availability, traffic aggregability and priority, and node bandwidth availability. Some embodiments use a gain function to quantify these factors and identify the best resource allocation for traffic flows. The gain function may be implemented in a resource allocator such as resource allocator 152.

For example, the resource allocator may receive a number of jobs (such as bandwidth requests) that may be allocated to a set of source nodes such as computational resources in baseband units (or radio units) and a set of destination nodes such as radio units (or computational resources in the baseband units) connected through a network, for which alternative/different allocations are possible. The resource allocator then evaluates for each job and combination of allocations (source and destination node pair alternatives), a number of alternative paths across the network connecting the source and destination nodes. The traffic demands/jobs can be packet or circuit-switched (or any other possible traffic types) and can share source and destination nodes, the paths across the network can be either packet-switched or circuit-switched (or any other possible traffic types).

The resource allocator may determine a policy for multiplexing various traffic types across the path that connects the source and destination resources. For example, packet-switched traffic (e.g., Ethernet traffic flows) are preferably mapped into links that are already using packet switching, rather than using an unused link. A defined gain function then quantifies different paths between different jobs (sources and destination node pair alternatives), and different allocations for a job (in case alternatives are possible for a given source and destination pair). This quantification is used to select the best job allocation onto nodes and best path between nodes across the network. In some embodiments, the gain function is a measure of available bandwidth for the different job types after the allocation.

The gain function may be used to calculate, for a link, the gain it provides in terms of bandwidth available to serve each traffic type and in terms of bandwidth to multiplex two or more traffic types together. Such gain is evaluated at the beginning of the path calculation and updated each time a traffic flow is allocated in the network. In case of different options for a path between the source and destination nodes and/or different options for source and/or destination nodes of a traffic flow, the path that maximizes the total gain is selected.

In some embodiments, the gain function is used as the following. First, the traffic types that need to be supported on a network is determined. The examples of traffic types include 10 MHz CPRI with X bit slot size, 5 MHz CPRI with Y bit slot size, and 1 Gbps Ethernet. The supported traffic types depend on the network environment that the resource allocator is operated in.

The gain of each link of the network is determined as a function of the following one or more parameters, where each parameter can be weighted according to the priority of traffic types, capacity of the flows, and other factors. The parameters include (a) available link bandwidth for each traffic type (see the examples of AB_TTj and AB_TTk in FIGS. 3A-3C, 6A-6B and 7A-7C above), (b) bandwidth for combination of traffic types that may be multiplexed together on a link (see examples in FIGS. 4A-4C and 5A-5C), and (c) available bandwidth on the other ports of the node to which the link belongs supporting the same traffic types as the link (see examples in FIGS. 6A-6B and 7A-7C), so that a higher gain is given to a link belonging to a node connected with nodes with the same traffic types to facilitate traffic aggregation.

The traffic flows to be allocated may be sorted according to a policy. For example, the policy may be first come first served (FCFS), round robin, or prioritization based on traffic flow requirements (e.g., QoS/SLA) and/or quantity of available resources in the network for a given traffic type (e.g., higher priority may be assigned to traffic type for which network resources are limited). Additionally or in alternative, traffic flows may be grouped so that traffic flows with the same or similar characteristics (e.g., same traffic types and with same source and/or destination options or same sub-paths) are allocated near each other in the allocation queue of the resource allocator.

Based on the policy, in some embodiments, the resource allocator selects a traffic flow and determines the source/destination alternatives and path alternatives that meet the traffic flow requirements (e.g., QoS/SLA), and determines the option that provides the maximum multiplexing gain and resulting in the highest total gain for traffic types that still need to be allocated.

With j representing a link, TTi representing traffic types where i indicates the number of traffic type, MGx representing multiplexing groups where x indicates the number of multiplexing groups. $A_{BW}$ indicates available bandwidth of a given traffic type, and $AG_{BW}$ indicates bandwidth to be multiplexed by a given multiplexing group, where they are weighted by Wi and Wx, respectively. The gain function may be expressed as the following formula for a link j:

$$\text{Gain } (j) = \sum_{i,j} W_i A_{BW_{j_{TTi}}} + \sum_{x,j} W_x AG_{BW_{j_{MGx}}} \qquad (1)$$

$$\text{Where } A_{BW_{j_{TTi}}} = \min\left(A_{BW_{j_{TTi}}}, \sum_{z \neq j} A_{BW_{z_{TTi}}}\right), \qquad (2)$$

$$AG_{BW_{j_{MGx}}} = \min\left(AG_{BW_{j_{MGx}}}, \sum_{z \neq j} AG_{BW_{z_{MGx}}}\right), \qquad (3)$$

an where z is the index of input links of the node where in originates an such node is a transit node.

Note that the min( ) function is to find the option that provides the least bottleneck on a transit node. For example, the available bandwidth for TTi is the minimum of the available bandwidth on link j for TTi and the sum of available bandwidth on all other links for TTi (see the discussion relating to bottleneck, e.g., FIGS. 6A-6B and 7A-7C).

While formula (1) is one way the gain function may be determined, other ways to determine the gain of link selections based on links' bandwidth availability, traffic aggregability and priority, and node bandwidth availability may be used in some embodiments. Additionally, the weight can be adjusted for both traffic types and multiplexing groups to make the gain function result consider the relative importance of traffic types/multiplexing groups thus more flexible for different network environments.

Additionally, weights used for one link may be different from the ones used in another link, and the weights of links can be adjusted based on the resource allocation. For example, each link may have a set of weights for traffic flows/types/aggregations, and after using the sets of weights for traffic flows/types/aggregations to allocate resources for some traffic flows, the efficiency of the allocation can be measured (e.g., through determining the traffic loss in statistical multiplexing, QoS of circuit-switched traffic), and the sets of weights can be adjusted to further optimize traffic allocation.

Once the first link is selected for a path using the gain function, the resource allocator continues to select the second link following the first link on the path, using the gain function again. The process continues until all links of the path are determined. Note since multiple node pair alternatives exist for a traffic flow (see for example, FIGS. 7A-7C), the resource allocator determines the gain for each resulting path and determines the best source/destination node option and its most efficient path, allowing the most available bandwidth for future bandwidth requests and aggregability with other flows.

FIG. 8 shows an example of allocation traffic flows in a network using a gain function per some embodiments. The network 800 includes nodes A to D at references 882 to 888, and two links coupled between two nodes are differentiated with link numbers, for example, AB_1 is the link to the left and AB_2 is the link to the right between nodes A and B. A table 852 includes traffic flows to be allocated in network 800, with parameters of the traffic flows listed. Note that these traffic flows have multiple options for their source and destination nodes, and they are six different traffic types with half being circuit-switched and the other packet-switched.

The traffic flows, traffic types, and traffic aggregation can be assigned with priorities. In this example, traffic flows are assigned priority low, medium, high, and they are used to determine the order through which traffic flows are to be allocated. The priority may be indicated through a weight such as a higher value indicating the higher priority as shown in the table, or the weight may be assigned so that the higher value indicates a lower priority in some embodiments.

The same or different priority (and associated weight) may be assigned to a traffic flow regarding its priority to aggregate. An assigned priority may be quantified with a value, e.g., the traffic type priority for aggregation is shown as weight value 1 or 2. The traffic flows may have aggregability indication. In this example, flow_0 is not to be aggregated, flow_1 prefers to be aggregated with the same and similar traffic types with 20-bit samples, and flow_2 prefers to be aggregated with the same traffic type (i.e., 20-bit samples). The packet-switched traffic flows, flow_4 to flow_6, prefer aggregating with traffic flows of the same or similar types with different peaks.

In this example, it is assumed that circuit-switched and packet-switched traffic flow cannot be mixed in the same link, and for circuit switching, each link supports two subframes of 120 bits, each of them can support 20-bit or 24-bit slots. The six traffic flows are assumed the totality of traffic flows to be allocated from bandwidth requests to the network 800.

It is further assumed that flow_1 and flow_5, being the high priority traffic flows, have been allocated already (with the checked marks next to the flows shown in FIG. 8). Flow_1 is allocated to link BC_1 and flow_5 is allocated to link BD_1. The next flow to be allocated is flow_0 (indicated with a question mark next to flow_0). Following the operations leading to Formula (1) above, the resource allocator selects a link for flow_0, and the options are links BD_2, BC_1, BC_2. Note that BD_1 is not an option because it is already allocated to flow_5, a packet-switched traffic flow, and flow_0, a circuit-switched traffic flow, cannot be mixed with the packet-switched traffic flow in the same link as assumed in the previous paragraph. Links BD_2 and BC_2, being empty without any flow allocated, will result in the link having the same gain. So for sake of simplicity, BD_2 can be excluded from detailed analysis, and only options of links BC_1 and BC_2 are analyzed below.

Option 1: If link BC_1 is selected, link BC_1 will carry 2×20 bit samples in subframe_1 and 4×24 bit samples in subframe_2, which results in 80 bits available in subframe_1 and 24 bits in subframe_2. Link BC_2 subframe_1 and subframe_2 are empty. Since flow_0 prefers not to be aggregated, only the first sum portion of formula (1), the gain for future bandwidth availability, needs to be determined. The gain for the future bandwidth availability can be written as the following: X1+BC_1_gain1+BC_2_gain1, where X1 is the sum of gains on the rest of the links after allocation of flow0 on BC_1.

BC_1_gain1=2×2×20 flows (there is availability for 2 more 2×20 flows in subframe_1), 1×4×20 flow (there is availability for 1 more 4×20 flow in subframe_1), and no availability for more 4×24 flows and for packet flows in either of the 2 subframes. BC_2_gain1=6×2×20 flows (there is availability for 6 more 2×20 flows in the 2 empty subframes), 3×4×20 flows (there is availability for 3 more 4×20 flows in the 2 empty subframes), 2×4×24 flows (there is availability for 2 more 4×24 flows in the 2 empty subframes), and availability for packet-switched traffic flows in the 2 empty subframes.

Option 2: If link BC_2 is selected, link BC_1 will carry 2×20 bit samples in subframe_1 and subframe_2 is empty. Link BC_2 subframe_1 will carry 4×24 bit samples in subframe_1 and subframe_2 is empty. The gain for the future bandwidth availability can be written as the following: X2+BC_1_gain2+BC_2_gain2, where X2 is the sum of gains on the rest of the links after allocation of flow0 on BC_2. BC_1_gain2=5×2×20 flows (there is availability for 2 more 2×20 flows in subframe_1 and 3 in subframe_2), 2×4×20 flows (there is availability for 1 more 4×20 flow in subframe_1 and 1 in subframe_2), 1×4×24 flows (there is availability for 1 more 4×24 flow in subframe_2), and no availability for packet flows in either of the 2 subframes. BC_2_gain2=3×2×20 flows (there is availability for 3 more 2×20 flows in subframe_2), 1×4×20 flows (there is availability for 1 more 4×20 flow in subframe_2), 1×4×24 flows (there is availability for 1 more 4×24 flow in subframe_2), and no availability for packet flows in either of the 2 subframes.

Considering the two options, for future bandwidth requests (circuit-switched flow_2, and packet-switched flow_3 and flow_4), option 1 of selecting link BC_1 for flow_0 results in better gain for flow_2 (1+3 4×20 flows vs. 2+1 4×20 flows) and packet-switched traffic flows flow_3 and flow_4 with the entire link BC_2 being available. Note that for the available bandwidth upon an allocation, percentage of available bandwidth on a link can be used to indicate bandwidth available for future requests, as doing so will allow bandwidth availability to be comparable between allowing a link for circuit switching and packet switching.

Once flow_0 is allocated to link BC_1, the next flow to allocate is flow_2. Flow_2 will be allocated to BC_1 since it will aggregate with flow_1, and the aggregation will result in the allocation of the first subframe on link BC_1 to be fully allocated—both flows have the 20 bit samples and combined together they fill in the 120-bit subframe. Thus, aggregability, as indicated as the second sum portion of formula (1), allows a resource allocator to use the gain function to identify the link for the traffic flow.

As the examples show, some embodiments take advantage of aggregation capabilities in a network for different supported traffic types, and they optimize the usage of network resources while guaranteeing traffic flow requirements. Additionally, they allow coexistence of different traffic types in a node and selection of optimum mode for its ports based on traffic flow requirements and path distribution. The gain function provides a comprehensive metric quantifying how efficiently an allocated capacity exploits both node and link aggregation capabilities (depending on network topology and traffic types supported by the network nodes), and embodiments may use the gain function to enhance existing routing algorithms and protocols such as ethernet spanning tree algorithm.

Operation Flow of Some Embodiments

Figure 9:
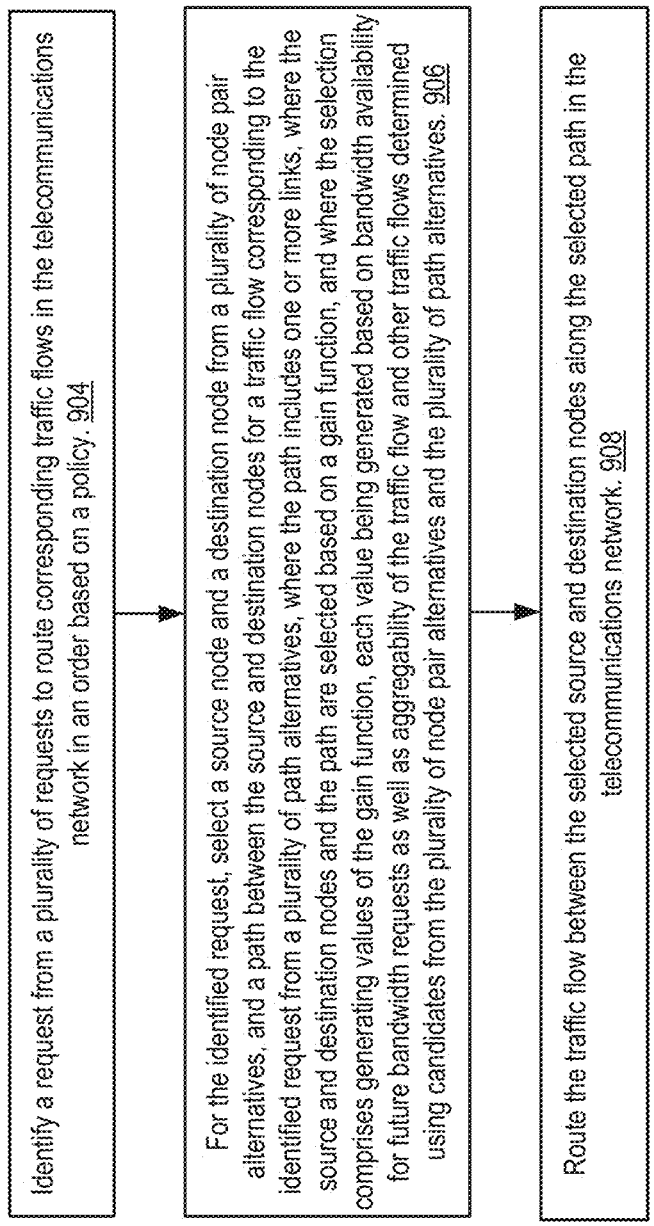
FIG. 9 is a flow diagram showing the operation flow of resource allocation per some embodiments.

FIG. 9 is a flow diagram showing the operation flow of resource allocation per some embodiments. The operations may be performed by a resource allocator such as the resource allocator 152. The resource allocator may allocate traffic flows to nodes of a telecommunications network.

In some embodiments, the nodes implement a type of common public radio interface (CPRI), wherein the plurality of node pair alternatives each includes a first node and a second node selected from a first plurality of radio equipment (RE) nodes or enhanced CPRI radio equipment (eRE) nodes, and a second plurality of radio equipment control (REC) nodes or enhanced CPRI radio equipment control (eREC) nodes in some embodiments.

At reference 904, the resource allocator identifies a request from a plurality of requests to route corresponding traffic flows in the telecommunications network in an order based on a policy. The policy may be one or more of the policies discussed herein above relating to sorting traffic flows. In some embodiments, the policy prioritizes the corresponding traffic flows based on respective weights assigned to the corresponding traffic flows.

At reference 906, for the identified request, the resource allocator selects a source node and a destination node from a plurality of node pair alternatives, and a path between the source and destination nodes for a traffic flow corresponding to the identified request from a plurality of path alternatives, where the path includes one or more links, where the source and destination nodes and the path are selected based on a gain function, and where the selection comprises generating values of the gain function, each value being generated based on bandwidth availability for future bandwidth requests and aggregability of the traffic flow and other traffic flows determined using candidates from the plurality of node pair alternatives and the plurality of path alternatives. Then at reference 908, the traffic flow is routed between the selected source and destination nodes along the selected path in the telecommunications network. The routing may be performed by the resource allocator but also may be performed by a network device based on the selection of the source and destination nodes and the path.

In some embodiments, the values of the gain function are further based on bandwidth availability of nodes on the path determined using the node pair and path candidates. In some embodiments, the bandwidth availability of nodes on the path determined using the node pair and path candidates is indicated in the gain function as a sum of available bandwidth at links on the nodes of the path candidates. See, for example, the discussion about formulae (1)-(3).

In some embodiments, the traffic flows include a plurality of types, and the path is selected to prioritize aggregating the corresponding traffic flow with existing and future traffic flows based on a type of the traffic flow. Additionally, the gain function sets different weights for each of the plurality of types of traffic flows in some embodiments.

In some embodiments, the plurality of types of traffic flows includes traffic flows of a first group that are circuit-switched traffic flows and a second group that are packet-switched traffic flows, wherein the aggregating the traffic flow with traffic flows within a same group is prioritized. In some embodiments, available bandwidths at links within the telecommunications network for each of the plurality of types of traffic flows are determined prior to identifying the request from the plurality of requests, where each link is configured for the first or the second group of traffic flows. The configuration of a link to either circuit-switched or packet-switched traffic flows are discussed herein above using examples.

In some embodiments, the bandwidth availability for the future bandwidth requests determined using the candidates from the plurality of node pair alternatives and the plurality of path alternatives is indicated in the gain function as a sum of bandwidth still available to serve in the telecommunications network. In some embodiments, the aggregability of the corresponding traffic flow and other traffic flows is indicated in the gain function as a sum of aggregated bandwidth for the plurality of types of traffic flows. Examples of the gain function are discussed herein above relating to formulae (1) to (3).

In some embodiments, the selecting from the plurality of node pair alternatives and the plurality of path alternatives are performed in parallel, and multiple node pair alternatives and path alternatives are evaluated simultaneously. Such simultaneous evaluation of multiple node pair alternatives and path alternatives can be performed by single instruction multiple data (SIMD) or single-instruction, multiple-thread (SIMT) execution units within the processor of a network device (e.g., processor 1012, 1042 discussed herein below). Through the simultaneous evaluation, the resource allocator may evaluate the options more efficiently.

Network Environment

FIG. 10A illustrates connectivity between network devices (NDs) within an exemplary network, as well as three exemplary implementations of the NDs, according to some embodiments. FIG. 10A shows NDs 1000A-H in network 1000, and their connectivity by way of lines between 1000A-1000B, 1000B-1000C, 1000C-1000D, 1000D-1000E, 1000E-1000F, 1000F-1000G, and 1000A-1000G, as well as between 1000H and each of 1000A, 1000C, 1000D, and 1000G. These NDs are physical devices, and the connectivity between these NDs can be wireless or wired (often referred to as a link). An additional line extending from NDs 1000A, 1000E, and 1000F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a special-purpose operating system (OS); and 2) a general-purpose network device 1004 that uses common off-the-shelf (COTS) processors and a standard OS.

The special-purpose network device 1002 includes networking hardware 1010 comprising a set of one or more processor(s) 1012, forwarding resource(s) 1014 (which typically include one or more ASICs and/or network processors), and physical network interfaces (NIs) 1016 (through which network connections are made, such as those shown by the connectivity between NDs 1000A-H), as well as non-transitory machine-readable storage media 1018 having stored therein networking software 1020. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A). In some embodiments, the network software 1020 includes the resource allocator 152, which performs operations discussed herein above.

The special-purpose network device 1002 is often physically and/or logically considered to include: 1) a ND control plane 1024 (sometimes referred to as a control plane) comprising the processor(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the processor(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
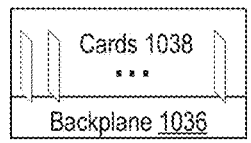
FIG. 10B illustrates an exemplary way to implement a special-purpose network device according to some embodiments.

FIG. 10B illustrates an exemplary way to implement the special-purpose network device 1002 according to some embodiments. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general-purpose network device 1004 includes hardware 1040 comprising a set of one or more processor(s) 1042 (which are often COTS processors) and physical NIs 1046, as well as non-transitory machine-readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization. For example, in one such alternative embodiment the virtualization layer 1054 represents the kernel of an operating system (or a shim executing on a base operating system) that allows for the creation of multiple instances 1062A-R called software containers that may each be used to execute one (or more) of the sets of applications 1064A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1054 represents a hypervisor (sometimes referred to as a virtual machine monitor (VMM)) or a hypervisor executing on top of a host operating system, and each of the sets of applications 1064A-R is run on top of a guest operating system within an instance 1062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1040, directly on a hypervisor (in which case the unikernel is sometimes described as running within a LibOS virtual machine), or in a software container, embodiments can be implemented fully with unikernels running directly on a hypervisor represented by virtualization layer 1054, unikernels running within software containers represented by instances 1062A-R, or as a combination of unikernels and the above-described techniques (e.g., unikernels and virtual machines both run directly on a hypervisor, unikernels and sets of applications that are run in different software containers). In some embodiments, the network software 1050 includes the resource allocator 152, which performs operations discussed herein above.

The instantiation of the one or more sets of one or more applications 1064A-R, as well as virtualization if implemented, are collectively referred to as software instance(s) 1052. Each set of applications 1064A-R, corresponding virtualization construct (e.g., instance 1062A-R) if implemented, and that part of the hardware 1040 that executes them (be it hardware dedicated to that execution and/or time slices of hardware temporally shared), forms a separate virtual network element(s) 1060A-R.

The virtual network element(s) 1060A-R perform functionality similar to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1062A-R to VNEs also apply to embodiments where such a finer level of granularity and/or unikernels are used.

In certain embodiments, the virtualization layer 1054 includes a virtual switch that provides similar forwarding services as a physical Ethernet switch. Specifically, this virtual switch forwards traffic between instances 1062A-R and the physical NI(s) 1046, as well as optionally between the instances 1062A-R; in addition, this virtual switch may enforce network isolation between the VNEs 1060A-R that by policy are not permitted to communicate with each other (e.g., by honoring virtual local area networks (VLANs)).

The third exemplary ND implementation in FIG. 10A is a hybrid network device 1006, which includes both custom ASICs/special-purpose OS and COTS processors/standard OS in a single ND or a single card within an ND. In certain embodiments of such a hybrid network device, a platform VM (i.e., a VM that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 10C illustrates various exemplary ways in which VNEs may be coupled according to some embodiments. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more of such servers (e.g., in the case of the general purpose network device 1004, one or more of the software instances 1062A-R may operate as servers; the same would be true for the hybrid network device 1006; in the case of the special-purpose network device 1002, one or more of such servers could also be run on a virtualization layer executed by the processor(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 10D illustrates a network with a single network element on each of the NDs of FIG. 10A, and within this straightforward approach contrasts a traditional distributed approach (commonly used by traditional routers) with a centralized approach for maintaining reachability and forwarding information (also called network control), according to some embodiments. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1070A-H (e.g., the processor(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs. In some embodiments, the network controller 1078 includes the resource allocator 152, which performs operations discussed herein above.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the processor(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general-purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 1074, but they may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination thereof). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 10701 in one of the virtual network(s) 1092 of FIG. 10D, according to some embodiments. FIG. 10E shows that in this virtual network, the NE 10701 is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments. Thus, the abstraction of a NE or VNE can span multiple NDs.

While some embodiments implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software.

Terms

A network interface (NI) may be physical or virtual; and in the context of IP, an interface address is an IP address assigned to a NI, being it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

A virtual circuit (VC), synonymous with virtual connection and virtual channel, is a connection-oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection-oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e., the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection-oriented packet switching, meaning that data is always delivered along the same network path, i.e., through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multi-protocol label switching (MPLS), which can be used for IP over virtual circuits (Each circuit is identified by a label.

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The term "node" can be a network node/device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Examples of network nodes also include NodeB, base station (BS), multi-standard radio (MSR) radio node such as MSR BS, eNodeB, gNodeB. MeNB, SeNB, integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, RRU, RRH, nodes in distributed antenna system (DAS), core network node (e.g., MSC, MME, etc.), O&M, OSS, SON, positioning node (e.g., E-SMLC), etc.

Another example of a node is an end-user device, which is a non-limiting term and refers to any type of wireless and wireline device communicating with a network node and/or with another UE in a cellular/mobile/wireline communication system. Examples of end-user device are target device, device to device (D2D) user equipment (UE), vehicular to vehicular (V2V), machine type UE, MTC UE or UE capable of machine to machine (M2M) communication, PDA, Tablet, mobile terminals, smart phone, laptop embedded equipment (LEE), laptop mounted equipment (LME), Internet-of-Things (IoTs) electronic devices, USB dongles, etc.

A node may be an endpoint node of a traffic flow (also simply referred to as "flow") or an intermediate node (also referred to as an on-path node) of the traffic flow. The endpoint node of the traffic flow may be a source or destination node (or sender and receiver node, respectively) of the traffic flow, which is routed from the source node, passing through the intermediate node, and to the destination node. A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports).

ALTERNATIVE EMBODIMENTS

While the block and flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for allocating traffic flows to nodes of a telecommunications network, the method comprising:
   identifying a request from a plurality of requests to route corresponding traffic flows in the telecommunications network in an order based on a policy;
   for the identified request, selecting a source node and a destination node from a plurality of node pair alternatives, and a path between the source and destination nodes for a traffic flow corresponding to the identified request from a plurality of path alternatives, wherein the path includes one or more links, wherein the source and destination nodes and the path are selected based on a gain function, and wherein the selection comprises generating values of the gain function, each value being generated based on bandwidth availability for future bandwidth requests as well as aggregability of the traffic flow and other traffic flows determined using candidates from the plurality of node pair alternatives and the plurality of path alternatives; and
   routing the traffic flow between the selected source and destination nodes along the selected path in the telecommunications network.

2. The method of claim 1, wherein the policy prioritizes the corresponding traffic flows based on respective weights assigned to the corresponding traffic flows.

3. The method of claim 1, wherein the nodes implement a type of common public radio interface (CPRI), wherein the plurality of node pair alternatives each includes a first node and a second node selected from a first plurality of radio equipment (RE) nodes or enhanced CPRI radio equipment (eRE) nodes, and a second plurality of radio equipment control (REC) nodes or enhanced CPRI radio equipment control (eREC) nodes.

4. The method of claim 1, wherein the values of the gain function are further based on bandwidth availability of nodes on the path determined using the candidates from the plurality of node pair alternatives and the plurality of path alternatives.

5. The method of claim 4, wherein the bandwidth availability of nodes on the path determined using the candidates from the plurality of node pair alternatives and the plurality of path alternatives is indicated in the gain function as a sum of available bandwidth at links on the nodes.

6. The method of claim 1, wherein the traffic flows include a plurality of types, and the path is selected to prioritize aggregating the corresponding traffic flow with existing and future traffic flows based on a type of the traffic flow.

7. The method of claim 6, wherein the gain function sets different weights for each of the plurality of types of traffic flows.

8. The method of claim 6, wherein the plurality of types of traffic flows includes traffic flows of a first group that are circuit-switched traffic flows and a second group that are packet-switched traffic flows, wherein the aggregating the traffic flow with traffic flows within a same group is prioritized.

9. The method of claim 8, wherein available bandwidths at links within the telecommunications network for each of the plurality of types of traffic flows are determined prior to identifying the request from the plurality of requests, wherein each link is configured for the first or the second group of traffic flows.

10. The method of claim 6, wherein the bandwidth availability for the future bandwidth requests determined using the candidates from the plurality of node pair alternatives and the plurality of path alternatives is indicated in the gain function as a sum of bandwidth still available to serve in the telecommunications network.

11. The method of claim 6, wherein the aggregability of the traffic flow and other traffic flows is indicated in the gain function as a sum of aggregated bandwidth for the plurality of types of traffic flows.

12. The method of claim 1, wherein the selecting from the plurality of node pair alternatives and the selecting from the plurality of path alternatives are performed in parallel, and wherein multiple node pair alternatives and path alternatives are evaluated simultaneously.

13. A network device for allocating traffic flows to nodes of a telecommunications network, the network device comprising:
a processor and machine-readable storage medium coupled to the processor, wherein the machine-readable storage medium stores instructions, which when executed by the processor, cause:
identifying a request from a plurality of requests to route corresponding traffic flows in the telecommunications network in an order based on a policy;
for the identified request, selecting a source node and a destination node from a plurality of node pair alternatives, and a path between the source and destination nodes for a traffic flow corresponding to the identified request from a plurality of path alternatives, wherein the path includes one or more links, wherein the source and destination nodes and the path are selected based on a gain function, and wherein the selection comprises generating values of the gain function, each value being generated based on bandwidth availability for future bandwidth requests as well as aggregability of the traffic flow and other traffic flows determined using candidates from the plurality of node pair alternatives and the plurality of path alternatives; and
routing the traffic flow between the selected source and destination nodes along the selected path in the telecommunications network.

14. The network device of claim 13, wherein the policy prioritizes the corresponding traffic flows based on respective weights assigned to the corresponding traffic flows.

15. The network device of claim 13, wherein the values of the gain function are further based on bandwidth availability of nodes on the path determined using the candidates from the plurality of node pair alternatives and the plurality of path alternatives.

16. The network device of claim 13, wherein the traffic flows include a plurality of types, and the path is selected to prioritize aggregating the corresponding traffic flow with existing and future traffic flows based on a type of the traffic flow.

17. The network device of claim 16, wherein the gain function sets different weights for each of the plurality of types of traffic flows.

18. The network device of claim 16, wherein the plurality of types of traffic flows includes traffic flows of a first group that are circuit-switched traffic flows and a second group that are packet-switched traffic flows, wherein the aggregating the traffic flow with traffic flows within a same group is prioritized.

19. The network device of claim 16, wherein the bandwidth availability for the future bandwidth requests determined using the candidates from the plurality of node pair alternatives and the plurality of path alternatives is indicated in the gain function as a sum of bandwidth still available to serve in the telecommunications network.

20. The network device of claim 13, wherein the selecting from the plurality of node pair alternatives and the plurality of path alternatives are performed in parallel, and wherein multiple node pair alternatives and path alternatives are evaluated simultaneously.

* * * * *